United States Patent [19]

Banks

[11] Patent Number: 4,465,289
[45] Date of Patent: Aug. 14, 1984

[54] CHUCK

[76] Inventor: William Banks, 1304 Pinehill Rd., Bettendorf, Iowa 52722

[21] Appl. No.: 282,784

[22] Filed: Jul. 13, 1981

[51] Int. Cl.³ .................... B23B 31/16; B23B 31/14
[52] U.S. Cl. ............................ 279/121; 279/1 C; 279/106
[58] Field of Search ............... 279/1 C, 123, 121, 106

[56] References Cited

U.S. PATENT DOCUMENTS

| | | | |
|---|---|---|---|
| 2,729,459 | 1/1956 | Leifer | 279/1 C X |
| 3,020,058 | 2/1962 | Feldman | 279/123 |
| 3,604,717 | 9/1971 | Hohwart | 279/106 |
| 3,938,815 | 2/1976 | F'Geppert | 279/1 C |
| 4,009,888 | 3/1977 | Wallace | 279/1 C |
| 4,047,723 | 9/1977 | Buck | 279/1 C X |
| 4,097,053 | 1/1978 | Steinberger | 279/1 C |
| 4,139,206 | 2/1979 | Knohl | 279/1 C |
| 4,240,645 | 12/1980 | Röhm | 279/1 C |

FOREIGN PATENT DOCUMENTS

| | | | |
|---|---|---|---|
| 2813832 | 10/1979 | Fed. Rep. of Germany | 279/123 |
| 2248901 | 5/1975 | France | 279/1 C |

Primary Examiner—Francis S. Husar
Assistant Examiner—Steven B. Katz
Attorney, Agent, or Firm—Henderson & Sturm

[57] ABSTRACT

This invention relates to chucks. Increasing effective operational rotational speeds of chucks, while reducing loss of gripping power due to such speeds, is achieved by a chuck with a wedge unit (13) having a greater expansion rate than that for a master plate unit (14). A master jaw (63) is balanced upon a master bearing (57) carried by the master plate unit and rocks thereon upon actuation of the wedge unit.

9 Claims, 12 Drawing Figures

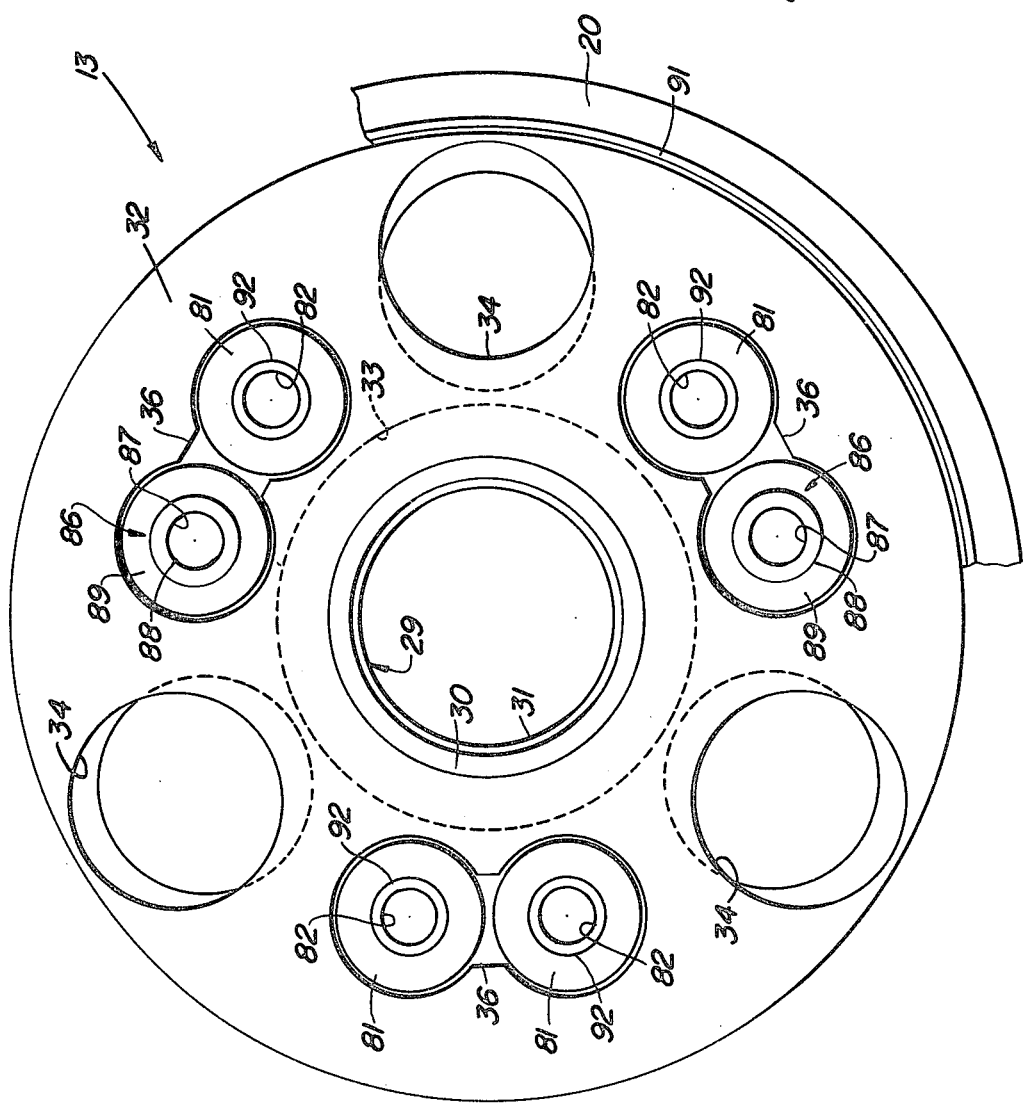

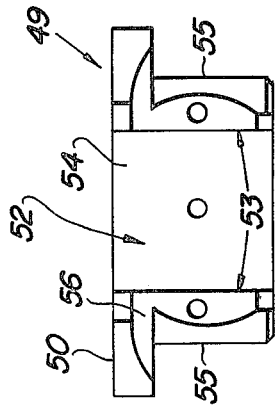
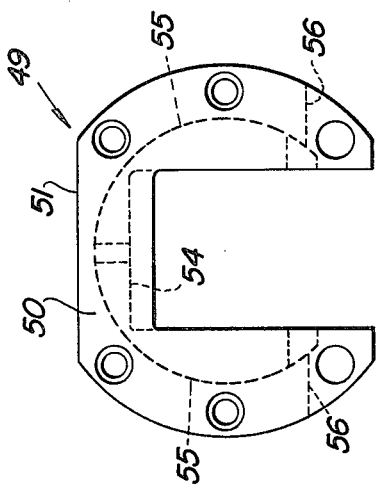
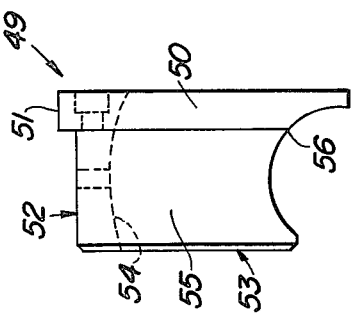
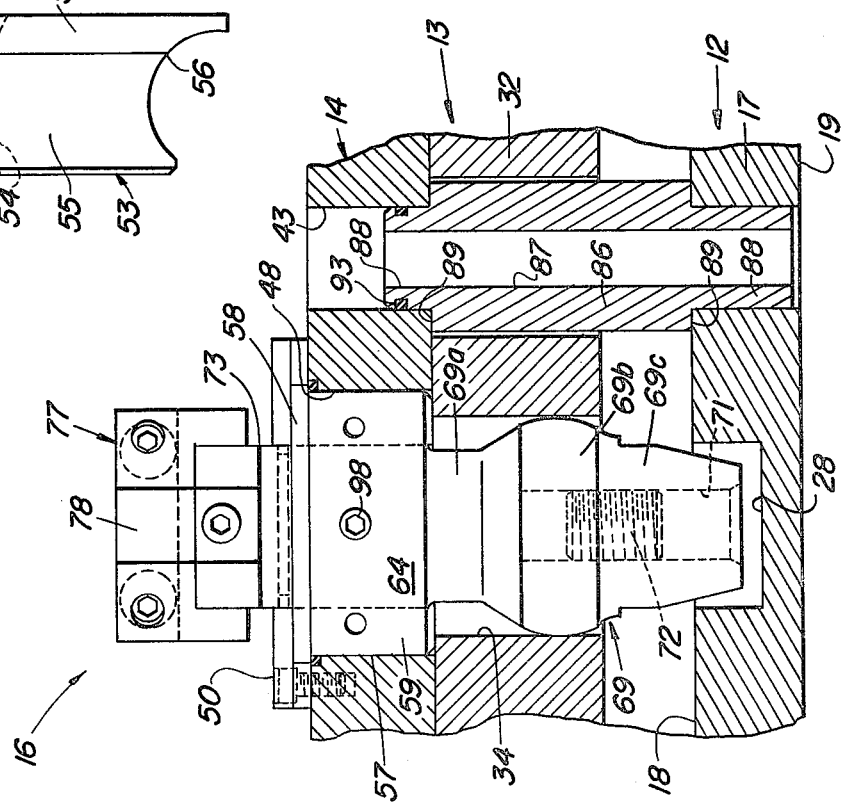

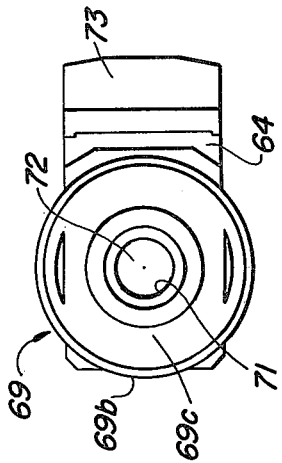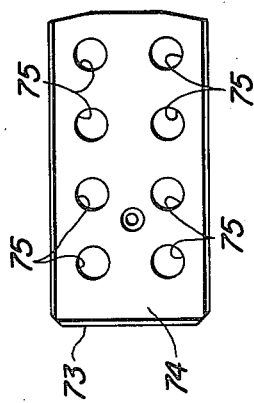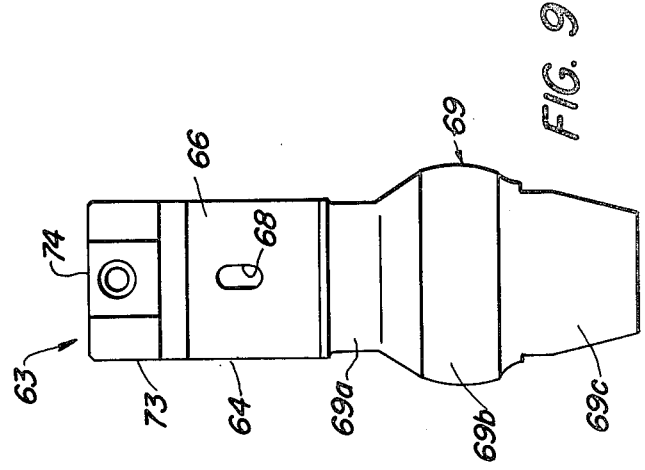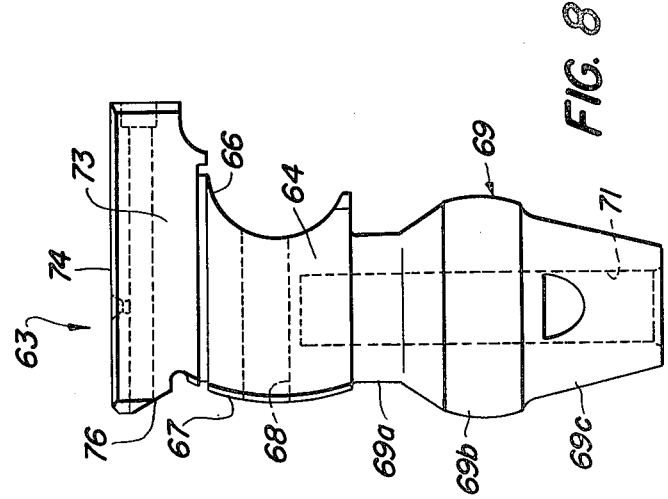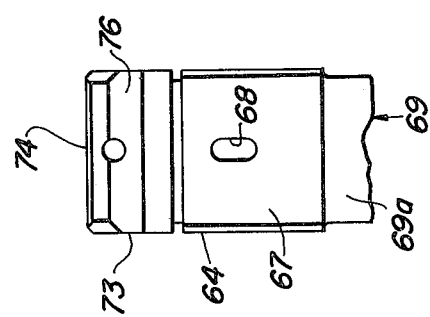

CHUCK

TECHNICAL FIELD

This invention is related to power chucks. More particularly this invention relates to power chucks designed for relatively high rotational speeds.

BACKGROUND ART

Chucks are employed for grasping and rotating a workpiece in a metalworking or woodworking machine. All chucks have limitations. Chucks may not be rotated at such a speed as will cause the chuck jaws to move radially away from the rotational axis, thereby so weakening the grip on the workpiece as to permit the same to come loose and fly dangerously from the machine. Recently a proliferation of machines, having high spindle speeds, high power, and very tough cutting tools of ceramic and the like, has exacerbated the aforementioned.

Generally, the attempted solution to the problem has been to attach complex counterweight mechanisms to the chuck jaws. Generally, the counterweights have moved away from the rotational axis, thereby attempting to stabilize or balance the jaws such that a firm grip on the workpiece is maintained at higher rotational speeds. The structures employed have been cumbersome, costly, and only partially effective, for a limited range of speeds.

Another attempted solution to the problem has been to increase the force actuating the chuck jaws prior to turning the workpiece, thereby increasing resistance to radial movement by the chuck jaws away from the rotational axis. A disadvantage of this is undesirable crimping or bending of portions of the workpiece.

DISCLOSURE OF INVENTION

This chuck invention includes a main bearing plate which expands at a first rate upon rotation of the chuck. A draw-bar actuated wedge expands at a second rate, greater than that of the main bearing plate, upon rotation of the chuck.

A master jaw assembly is pivotally mounted on a rocker member fixed to the main bearing plate. The jaw assembly is adjustable to position the center of mass thereof adjacent the rocker member.

The chuck draw tube acts to pull the wedge. The master jaw assembly is pivoted about the rocker member by the wedge, thereby clamping the workpiece. As the rotational speed of the chuck is increased, the greater expansion of the wedge with respect to the main bearing plate results in maintaining the master jaw pivoted against the workpiece.

The chuck is sealed in oil.

An object of this invention is provision of a power chuck having permanently lubricated low friction, high efficiency, internal mechanisms, thereby reducing unequal lubrication, grease build-up and sling-out, and uncontrolled friction and imbalances which result from the same.

Also an object of this invention is provision of a power chuck capable of attaining increased high rotational operating speeds.

It is an object of this invention to provide a power chuck with a master jaw assembly having improved balancing such that a proper grip is maintained on a workpiece at increased rotational speeds.

A further object of this invention is provision of a power chuck having improved stress-bearing areas.

These objects and other features and advantages of the chuck invention will become readily apparent upon referring to the following description together with the drawings.

BRIEF DESCRIPTION OF THE DRAWING

The chuck invention is illustrated in the drawing wherein:

FIG. 3 is a top plan view of the chuck with components thereof removed to more clearly show the wedge unit;

FIG. 4 is an end elevational view of the master guide:

FIG. 5 is a top plan view of the master guide;

FIG. 6 is a side elevational view of the master guide;

FIG. 7 is a fragmentary elevational view, parts of the chuck being cut away to show the jaw assembly;

FIG. 8 is a side elevational view of the master jaw;

FIG. 9 is an elevational view of the master jaw;

FIG. 10 is a fragmentary, end elevational view of the master jaw;

FIG. 11 is a top plan view of the master jaw; and

FIG. 12 is a bottom plan view of the master jaw.

BEST MODE FOR CARRYING OUT THE INVENTION

Figure 2:
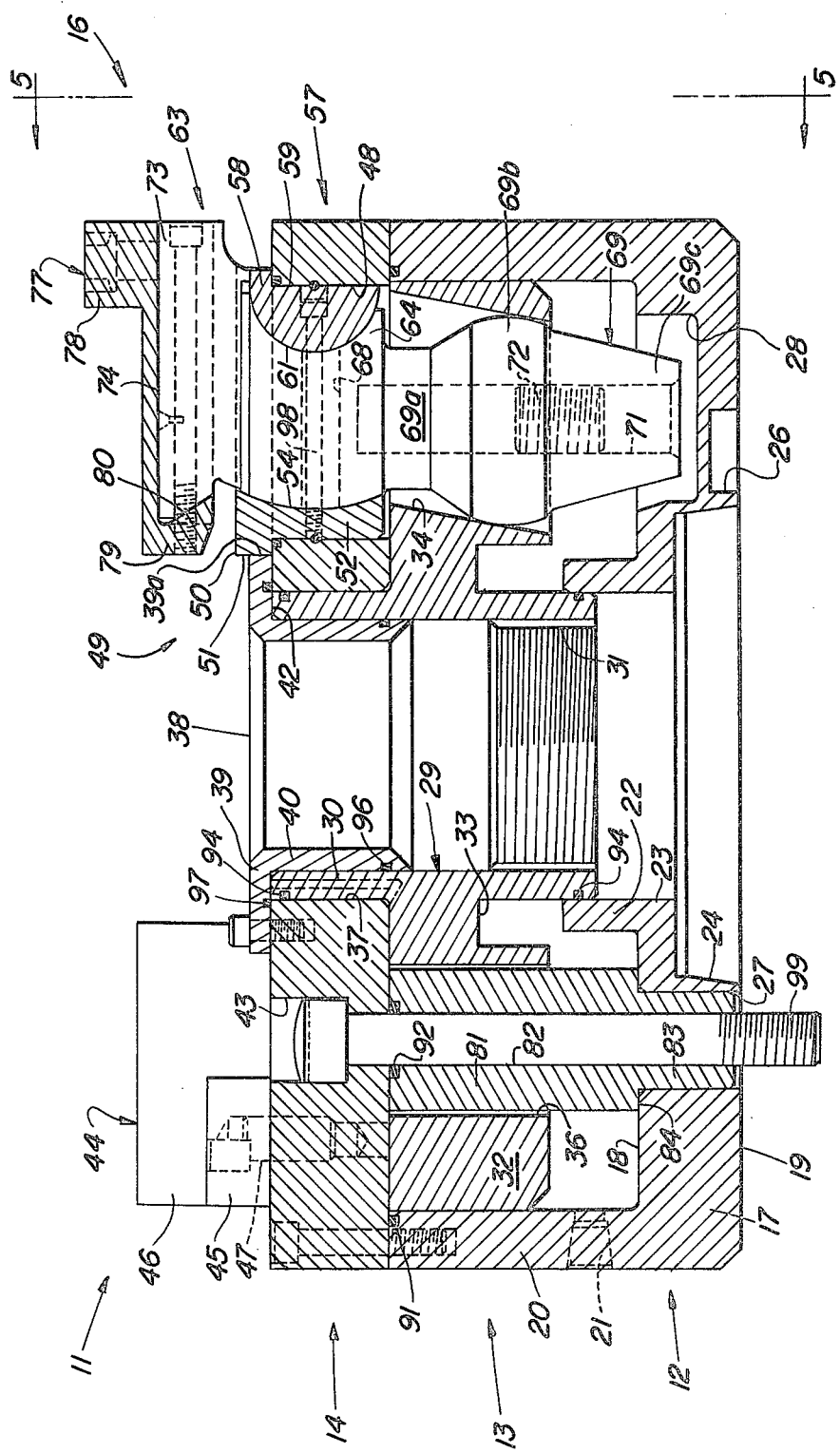
FIG. 2 is a vertical cross section of the chuck taken along line 2—2 in FIG. 1, the master jaw and work stop not being shown in section.

The chuck of this invention is shown generally at 11 in FIG. 2. More particularly, the chuck 11 includes a body unit 12, a wedge unit 13, a master plate unit 14 and a jaw assembly 16.

Referring now also to FIG. 3, the body unit 12 includes a bottom wall 17 having a top side surface 18 and a back end surface 19. An annular side wall 20 is joined to wall 17 at the periphery of surface 18. An oil inlet 21 is formed through side wall 20.

An interior annular wall 22 is joined to surface 18 about a central axial bore 23 formed through wall 17. A mounting bore 24 (type A American Standard A8 taper being illustrated) is formed into back end surface 19, communicates with and is coaxial with bore 23.

A driving hole 26 is formed into surface 19.

Six attachment bores 27, radially spaced in pairs as is the industry standard, are formed through wall 17.

Three radially spaced relief holes 28 are formed into top surface 18.

The wedge unit 13 (FIGS. 2 and 3) includes a central, cylindrical sleeve 29 with an upper end 30 and a lower, interiorly threaded, end 31. An annular disk 32 is joined to sleeve 29, intermediate ends 30, 31, an annular underside slot 33 being formed into disk 32 adjacent lower end 31. Three wedge bores 34, radially spaced, are formed through disk 32. The axes of bores 34 are slanted radially inwardly as the bores 34 extend downwardly toward end 31 and away from end 30. Three pairs of connected bores 36 also are radially spaced and formed through disk 32.

The master plate unit 14 (FIGS. 1 and 2) has a central, axial bore 37 formed therethrough. A center shield 38 has an annular flange 39 fixed to one end of a sleeve 40. Three radially spaced flats 39a are formed in the peripheral surface of flange 39. The shield 38 is fixed to plate unit 14, the flange 39 being attached to top surface 41, and the sleeve 40 extending coaxially through the bore 37. The sleeve 40 is suspended away from the plate unit 14 such that a downwardly opening annular slot 42 is formed.

Paired, radially spaced attachment bores 43 are formed through plate unit 14.

Each of the three work stops 44 include an attachment block 45 and a stop block 46 fixed as by bolts to bores 47 formed into top surface 41. The work stops 44 are radially spaced, and the stop blocks 46 are disposed along radii of plate unit 14.

Radially spaced jaw-bearing bores 48 are formed through master plate unit 14.

The jaw assembly 16 includes a master guide 49 (FIGS. 1, 2, 4, 5 and 6). A top flange 50 is generally C-shaped as viewed in plan, having a flat transverse surface 51. Body and side walls 52, 53 depend from the flange 50. The walls 52, 53 are connected such that, together with the flange 50, they form a channel generally U- or C-shaped in section. Body wall 52 has an interior, concave surface 54 facing the channel, the plane defined by the radius of curvature being parallel to the side walls 53. Wall 52 has an exterior, convex curved surface 55, the plane defined by the radius of curvature being normal to side walls 53. Arcuate surfaces 56 are formed into the ends of the walls 53 away from body 52.

Figure 1:
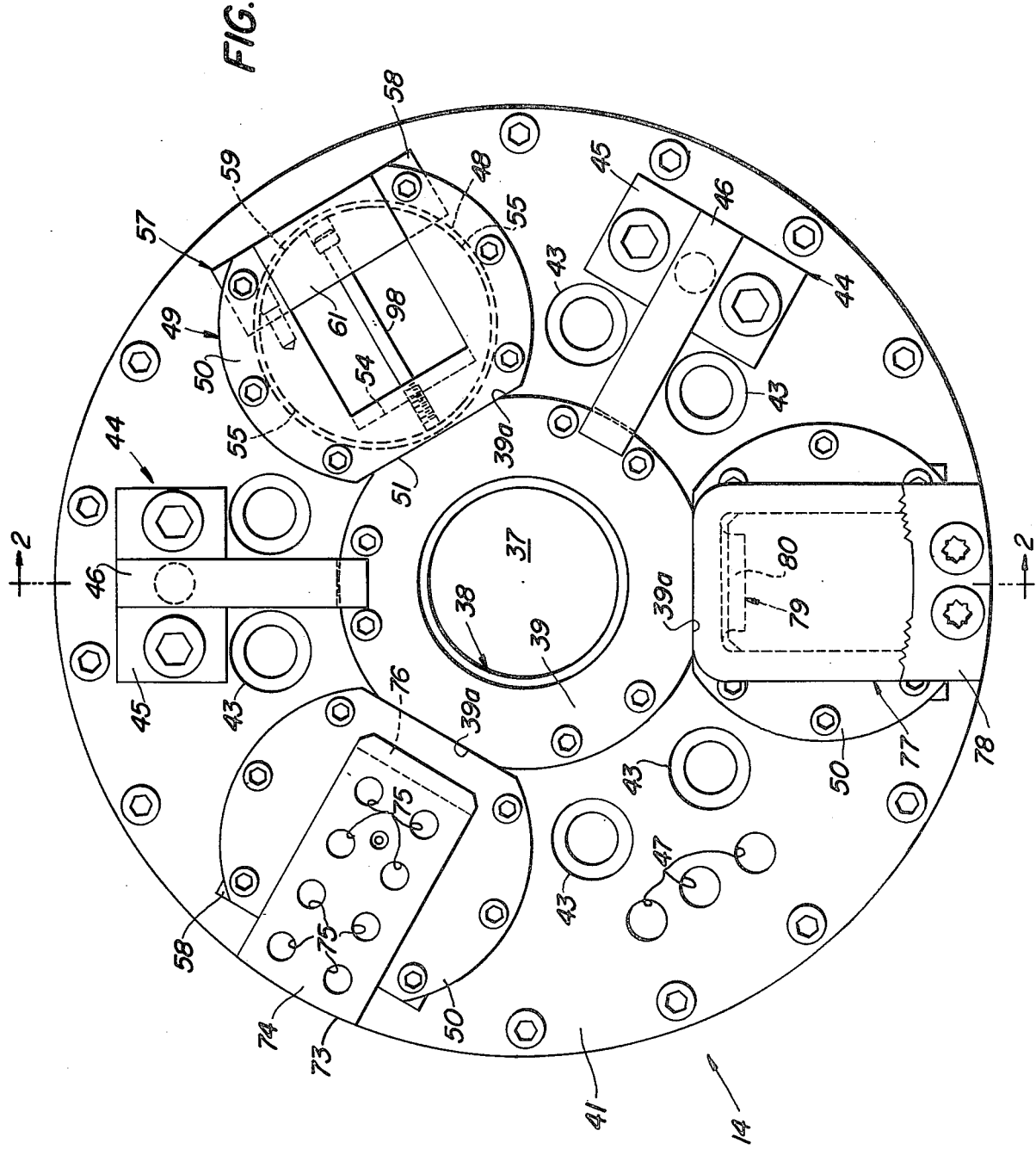
FIG. 1 is a top plan view of the chuck, certain components thereof not being shown for greater clarity.

The jaw assembly 16 also includes a master bearing 57 generally semicircular in cross section. Referring to FIGS. 1, 2 and 7, an elongated shoulder or flange 58 is disposed above a convex curved supported surface 59. The opposite, bearing surface 61 generally is convex, the plane of its radius of curvature being normal to that for the radius of curvature of surface 59.

The jaw assembly 16 further includes a master jaw 63 (FIGS. 1, 2, and 7 to 12). A main body 64 has a concave supported surface 66 and an opposite, convex guided surface 67. An assembly bore 68 is formed through body 64 from surface 66 to surface 67. A depending mass 69 includes a stem 69a joined to the underside of body 64, an enlarged area 69b joined to the stem 69a, and an end area 69c extending and tapering from area 69b. A threaded axial bore 71 extends through mass 69 from end 69c into body 64. A mass adjustment screw 72 is threaded into bore 71.

A platform 73 is joined to main body 64 opposite depending mass 69. Formed into the top surface 74 of platform 73 is a plurality of top-jaw attachment bores 75. The top surface 74 defines a plane normal to bore 71 and the general long axis of the master jaw 63. The top surface 74 generally is rectangular in shape and elongated, extending from the side of the master jaw 63 having surface 66 to the side having surface 67. A ramp surface 76 extends from top surface 74 downwardly and back toward the long axis of the master jaw 63.

The top jaw 77 has a standard chucking surface at one end 78. At the opposite end is a depending mass 79 having a surface disposed at an acute angle to the underside of the top jaw 77, thereby forming a ramp-engaging channel 80.

The jaw assembly 16 of the chuck 11 illustrated includes three sets of master guide 49, bearing 57 and jaw 63.

Assembly posts 81 (FIG. 2) are elongated and cylindrical, having longitudinal axial bores 82. Each post 81 has an end portion 83 of lesser cross sectional dimension such that a shoulder 84 is formed.

Locating posts 86 also are elongated and cylindrical and have an axial bore 87. Each post 86 at both ends 88 has portions of lesser cross sectional dimension such that shoulders 89 are formed.

The chuck 11 is assembled by placing assembly and locating posts 81, 86 in the body unit 12, end portions 83, 88 fitting into attachment bores 27, shoulders 84, 89 bearing against top side 18. A body seal 91 is placed in a groove therefor formed in the extended end surface of side wall 20. Post seals 92 and 93 are placed in grooves therefore formed in the upper ends of posts 81, 86.

Wedge seals 94 are placed into grooves formed into sleeve 29 adjacent ends 30, 31. The wedge unit 13 is lowered into the body unit 12, the threaded end 31 being received within interior wall 22, the assembly and locating posts 81, 86 passing through bores 36.

One center seal 96 is located in a groove formed into the sleeve 40 adjacent the depending end thereof and facing slot 42. A second center seal 97 is placed, prior to attachment of shield 38 to the master plate unit 14, into a groove cut in the underside of flange 39.

The master plate unit 14 is placed over the body and wedge units 12, 13. The locating posts 86 (two are shown in this embodiment) engage bores 43. The unit 14 also rests on body side wall 20 and assembly posts 81, the bores 43, 82 being aligned, and the bores 48, 34 and reliefs 28 being generally aligned. The unit 14 then is fixed to unit 12 as by screws.

The master jaw main body 64 is placed within the channel formed by the master guide 49 such that the guide surface 54 and guided surface 67 abut, and the platform 73 is projected from the channel adjacent top flange 50. The master bearing 57 is positioned such that the bearing surface 61 abuts supported surface 66 and surfaces 56, the flange 58 being disposed adjacent the platform 73. Assembly pin 98 fixes together the master guide 49 and master bearing 57 and passes through bore 68 of the main body 64. The adjustment screw 72 is threaded into bore 71 and positioned therein to balance the master jaw 63 about master bearing 57.

The assembly of master guide, bearing and jaw 49, 57, 63 then is lowered into the master plate unit 14 through jaw-receiving bore 48. The master bearing shoulder 58 engages top side 41 adjacent the periphery of unit 14. The master guide flange 50 engages side 41 radially inwardly, the flat surface 51 engaging the center shield flats 39a. The mass 69 extends through wedge bore 34, the end 69c being disposed within relief 28. The flange 50 and shoulder 58 then are fixed to master plate unit 14 as by screws.

The top jaw 77 is positioned upon the platform 73, the channel 80 engaging the ramp 76. The jaw 77 is fixed as by screws down through the chucking member 78 into bores 73, and screws through the platform 73, parallel to top surface 74, into the mass 79.

The work stops 44 are fixed to the master plate 14 as by screws.

The assembled chuck 11 then is partially filled with oil, as through oil inlet 21. A cap is fitted to plug inlet 21.

The chuck 11 is attached to the spindle nose of a metal turning lathe or grinder (not shown), the back end surface 19 abutting the spindle nose. Attachment pins 99 pass, through bores 43 and the bores 82, 87 of assembly and locating posts 81, 86, into the spindle nose to fix the chuck 11 to the machine. The draw bar (not shown) of the machine is threaded into end 31 of sleeve 29.

The various components of the chuck 11 are formed from steel, cast and machined according to methods known to those skilled in metal working arts. The master plate unit 14 preferably is constructed from AISI-6150 steel, and wedge unit 13 may be constructed from S-7 high strength chisel steel, such that the wedge unit 13 expands at a greater rate than the master plate unit 14 upon rotation of the chuck 11. Alternately, the wedge unit 13 also may be formed from AISI-6150 steel; however, the bores 36 then are enlarged to reduce the cross-sectional mass, thereby retaining different rates of expansion for the wedge and master plate units 13, 14. Preferably, the wedge 13 expands at a rate twice that of the plate 14.

The chuck 11 is illustrated assembled for outside diameter gripping of a workpiece. However, by inserting the assembly of master guide 49, bearing 57 and jaw 63 such that master bearing shoulder 58 abuts center shield flat 39a, the chuck 11 may be assembled for inside diameter gripping of the workpiece.

In operation, the pneumatic or hydraulic cylinder (not shown) of the machine pulls the draw bar such that the wedge unit 13 is drawn toward bottom plate 17 of the body unit 12. The wedge bore 34 engages enlarged mass area 69b causing the master jaw 63 to rock on master bearing surface 61. The depending mass 69 pivots away from the rotational axis of the chuck 11; whereas, the platform 73 carrying the top jaw 77 pivots toward the same axis. The top jaws 77 thereby are made to clamp the workpiece. Furthermore, the jaws 77 pull the workpiece toward plate unit 14, down onto the work stops 44, to hold more firmly the workpiece.

As the chuck 11 is brought up to operational rotational speed, the components thereof radially expand. The balanced jaw assembly 16 mass is centered adjacent master bearing surface 61 in the plane of the master plate unit 14. As the expansion of the wedge unit 13 is greater than that of the plate unit 14, the attitude of the jaw assembly 16 is maintained, and lessening of chucking pressure due to rotation is minimized. Preferably, the chucking surface 78, which engages the workpiece, and the enlarged area 69b, which is engaged by the wedge bore 34, are equidistant from the master bearing surface 61, and the wedge unit 14 expands at twice the rate of the master plate unit 13.

As the rotational speed increases, the top jaw mass 79 tends to slide down the ramp surface 76, causing the top jaw 79 to hug the platform 73 and be more firmly fixed to the master jaw 63. Forces are transferred, as through the channel area 80, more directly from top jaw 77 to master jaw 63, rather than through fastening screws. Furthermore, the top jaw 79 is located very accurately by the interaction of the mass 79 and ramp 76, top jaws in standard chucks being less accurate due to keys and clearances required therefor.

The chuck 11 is sealed and lubricated as by oil. Wear is minimized thereby because entrance of foreign matter to the chuck 11 interior is reduced and because grease sling-out problems are eliminated.

Industrial applicability of the chuck 11 is believed to be readily apparent. Generally, substantially higher operational rotational speeds can be attained by the chuck 11, the structure thereof providing a less complicated, more effective means of reducing loss of chuck grip at increased rotational speeds. The chuck 11 may be employed with manual, as well as power, chuck packages and also with integral hydraulic power cylinder packages.

Although a preferred embodiment has been disclosed herein, various modifications and alternate constructions can be made thereto without departing from the full scope of the invention defined in the claims.

I claim:

1. A chuck, for coupling to a draw tube and holding and rotating a workpiece, comprising:
   body means;
   expansion plate means, joined to said body means, having a first rate of expansion upon rotation;
   expansion wedge means, coupled to the draw tube and disposed between said body and expansion plate means, having a second rate of expansion upon rotation;
   jaw means rockably mounted in said expansion plate means, engaged by said expansion wedge means, and rockable, upon actuation of said expansion wedge means by the draw tube, to grip the workpiece; and
   said second rate of expansion being greater than said first rate of expansion such that said expansion plate means and expansion wedge means upon rotation take up centrifugal loads, said jaw means' gripping of the workpiece being maintained thereby.

2. The chuck of claim 1 and further wherein guide and bearing means is mounted in said expansion plate means, said jaw means being rockably mounted in said guide and bearing means.

3. The chuck of claim 2 and further wherein said jaw means is balanced to locate the mass center thereof within said guide and bearing means.

4. The chuck of claim 3 and further wherein said jaw means includes internal balancing screw means.

5. The chuck of claim 3 and further wherein said jaw means includes an enlarged member engaged by said expansion wedge means, and a top jaw is mounted on said jaw means, said enlarged member and top jaw being disposed to opposite sides of said expansion plate means and equidistant from said guide and bearing means, said second rate of expansion being twice said first rate of expansion.

6. The chuck of claim 2 and further wherein said jaw means includes a platform and a ramp surface formed into said platform, a top jaw has a depending mass and is mounted on said platform, said depending mass engaging said ramp surface.

7. The chuck of claim 1 and further wherein said expansion wedge means includes a plurality of holes formed therein to reduce cross sectional mass thereof, whereby said second rate of expansion is attained.

8. The chuck of claim 1 and further wherein said expansion plate means consists of AISI-6150 steel and said expansion wedge means consists of S-7 chisel steel.

9. A chuck, for coupling to a draw tube and holding a rotating a workpiece, comprising:
   body means;
   expansion plate means, joined to said body means, having a first rate of expansion upon rotation;
   expansion wedge means, coupled to the draw tube and disposed between said body and expansion plate means, having a second rate of expansion upon rotation, said second rate of expansion being greater than said first rate of expansion;
   guide and bearing means mounted in said expansion plate means;
   jaw means rockably mounted in said guide and bearing means, engaged by said expansion wedge means, and rockable, upon actuation of said expansion wedge means by the draw tube, to grip the workpiece;

and further wherein said guide and bearing means includes connected master guide and master bearing, a concave guide surface being formed on said master guide, a convex bearing surface being formed on said master bearing, said jaw means including a main body, a convex guided surface and a concave bearing surface being formed on said body, said guiding and guided surfaces abutting and said bearing surfaces abutting when said jaw means is mounted.

* * * * *